United States Patent
Brewer et al.

(10) Patent No.: US 7,477,973 B2
(45) Date of Patent: Jan. 13, 2009

(54) VEHICLE GYRO BASED STEERING ASSEMBLY ANGLE AND ANGULAR RATE SENSOR

(75) Inventors: Douglas E. Brewer, Sunnyvale, CA (US); Gregory W. White, Ben Lomond, CA (US); John William Peake, San Francisco, CA (US)

(73) Assignee: Trimble Navigation Ltd, Sunnyvale, CA (US)

( * ) Notice: Subject to any disclaimer, the term of this patent is extended or adjusted under 35 U.S.C. 154(b) by 537 days.

(21) Appl. No.: 11/251,743

(22) Filed: Oct. 15, 2005

(65) Prior Publication Data
US 2007/0088477 A1  Apr. 19, 2007

(51) Int. Cl.
*B62D 6/00* (2006.01)

(52) U.S. Cl. ........................................ 701/41

(58) Field of Classification Search ............. 701/41–44; 180/6.2, 6.24, 6.6; 280/1.195, 1.202; 475/18; 477/1
See application file for complete search history.

(56) References Cited

U.S. PATENT DOCUMENTS

| | | | |
|---|---|---|---|
| 5,408,411 A * | 4/1995 | Nakamura et al. ............ 701/48 |
| 5,732,377 A * | 3/1998 | Eckert ........................ 701/83 |
| 5,812,267 A * | 9/1998 | Everett et al. ............... 356/614 |
| 5,878,357 A * | 3/1999 | Sivashankar et al. ........... 701/1 |
| 6,122,568 A * | 9/2000 | Madau et al. ................. 701/1 |
| 6,138,066 A * | 10/2000 | Guo et al. .................... 701/38 |
| 6,684,140 B2 * | 1/2004 | Lu ............................. 701/37 |
| 6,829,524 B2 | 12/2004 | Chee |
| 7,266,444 B2 * | 9/2007 | Katayama et al. ........... 701/124 |

\* cited by examiner

*Primary Examiner*—Yonel Beaulieu
(74) *Attorney, Agent, or Firm*—Boris G. Tankhilevich (57) ABSTRACT

A method for estimation of relative coordinates between at least two parts of a system. The method generally includes two main steps: measuring a set of relevant coordinates for each part of the system; and processing each measurement result to estimate the relative coordinates between at least two parts of the system. The system includes a main body and at least one sub assembly. A first sensor A is configured to measure a movement rate of a sub assembly. A second sensor B is configured to measure a movement rate of a main body. A third absolute measurement sensor C is configured to estimate an integrator offset and a drift rate due to the first sensor A bias and due to the second sensor B bias.

19 Claims, 5 Drawing Sheets

VEHICLE GYRO BASED STEERING ASSEMBLY ANGLE AND ANGULAR RATE SENSOR

BACKGROUND OF THE INVENTION

1. Field of the Invention

The present invention is in the field of position tracking and machine control systems, and, more specifically, is directed to the field of using position and angular rate sensors for machine control systems.

2. Discussion of the Prior Art

Rate gyros are well known in the vehicle arts for determining heading and yaw of a vehicle like a car. They are an integral part of improving steering and handling in cars.

More specifically, gyros are commonly used to provide an estimate of a rate of rotation about a particular axis. In wheeled vehicle applications, a gyro can be used to help guide and navigate a wheeled vehicle. In other wheeled vehicle applications, a single-axis gyro is typically used to feed an estimate of yaw rate to a stability control system that is capable of making adjustments to vehicle operation that help increase vehicle stability under a wide variety of operating conditions.

Vehicle stability control systems commonly include a computer that executes an algorithm that monitors vehicle operation. Usually, several sensors and engine operation is monitored. If the algorithm determines that the vehicle is unstable or is in danger of becoming unstable, vehicle operation is adjusted in a manner intended to increase stability. Usually, vehicle operation is adjusted by applying one or more brakes. Engine speed can also be controlled.

Sensors that are typically monitored include one or more wheel speed sensors, a steering angle sensor, a yaw rate sensor, and a lateral acceleration sensor. During vehicle operation, signals from one or more of these sensors are used to determine an acceptable yaw rate threshold given the speed of the vehicle, its lateral acceleration, and its steer angle. If the actual yaw rate provided from the yaw rate sensor exceeds the acceptable yaw rate threshold, vehicle stability control is initiated.

However, the prior art rate gyros were not used for precise estimation of relative angular coordinates between at least two parts of a vehicle, including a main body and at least one ground controllable wheel.

SUMMARY OF THE INVENTION

The object of the present invention is to provide a robust, inexpensive and easy way to install steering assembly angle sensor to satisfy the Automatic Guidance System continuous feedback, closed loop control steering angle requirement for front wheel steered and articulated steered (center pivot) vehicles. The current technology utilizes rotary and linear style potentiometers (with associated mechanical linkages as required) affixed between chassis and steering assembly elements resulting in an absolute steering assembly angle measurement relative to the vehicle chassis. The present invention eliminates all linkages and many brackets. The present invention is universal to all types of steered vehicles. Installation time and costs are reduced, while improving sensor robustness and reliability.

More specifically, the present invention discloses a method and an apparatus for precise estimation of relative angular coordinates between at least two parts of a vehicle, including a main body and at least one ground controllable wheel.

One aspect of the present invention is directed to a method for estimation of relative coordinates between at least two parts of a system.

In one embodiment, the method of the present invention comprises the following steps: (A) providing each of at least two parts of the system with at least one coordinate sensor; (B) measuring a set of relevant coordinates for each relevant part of the system; and (C) processing each measurement result performed in the step (B) to estimate the relative coordinates between at least two the parts of the system. In this embodiment of the present invention, the relative coordinates are selected from the group consisting of: {relative position coordinates; relative position rate (velocity) coordinates; relative position acceleration coordinates; relative angle coordinates; relative angular rate coordinates; and relative angular acceleration coordinates}.

In one embodiment of the present invention, wherein the system comprises a main body and at least one sub assembly, the step (A) further comprises the following steps: (A1) mounting a first sensor A to at least one sub assembly to measure a movement rate of the sub assembly; (A2) mounting a second sensor B to the main body to measure a movement rate of the main body; and (A3) providing a third absolute measurement sensor C configured to estimate an integrator offset and a drift rate due to the first sensor A bias and to the second sensor B bias. In this embodiment of the present invention, the movement rate of the main body is selected from the group consisting of: {linear velocity, linear acceleration; angular velocity; and angular acceleration}. In this embodiment of the present invention, the movement rate of the sub assembly is selected from the group consisting of: {linear velocity, linear acceleration; angular velocity; and angular acceleration}.

In one embodiment of the present invention, wherein the system comprises a main body and at least one sub assembly, the step (B) further comprises the following steps: (B1) using the first sensor A to measure the movement rate of at least one sub assembly; (B2) using the second sensor B to measure the movement rate of the main body; and (B3) using the third sensor C measurement to estimate the integrator offset and the drift rate due to the first sensor A bias and due to the second sensor B bias.

In one embodiment of the present invention, the step (C) further comprises the following steps: (C1) processing the measurement result performed in the step (B1) and the measurement result performed in the step (B2) to estimate a difference between the measurement result performed in the step (B1) and the measurement result performed in the step (B2); (C2) integrating over time the difference estimate obtained in the step (C1) to estimate the relative motion between the main body and at least one sub assembly; and (C3) processing the estimate result performed in the step (B3) to provide a set of correction data to the estimate result obtained in the step (C2).

In one embodiment of the present invention, the step (C2) further comprises the step of integrating over substantially continuous time period the difference estimate obtained in the step (C1) to estimate the relative motion between the main body and at least one sub assembly.

In one embodiment of the present invention, the step (A) further comprises the following steps: (A4) providing a vehicle having at least one controllable ground wheel and a main body; (A5) providing the sensor A comprising a single rate gyroscope attached to at least one controllable ground wheel of the vehicle, wherein the sensor A is configured to measure a selected plane parallel to ground; (A6) providing the sensor B comprising at least one rate gyroscope attached to the main body of the vehicle, wherein the sensor B is mounted in the selected plane and is configured to measure the selected plane; (A7) providing the sensor C configured to estimate an absolute steering angle of the vehicle based on the vehicle kinematics model; and (A8) using a feedback compensator to estimate and to compensate the integrator offset and the drift rate based on estimation of the absolute steering angle performed in the step (A7).

In one embodiment of the present invention, wherein the vehicle includes a single controllable ground wheel and a main body, the step (A5) further comprises the following step: (A5, 1) providing the sensor A comprising a single rate gyroscope attached to the controllable ground wheel of the vehicle; wherein the sensor A is configured to measure a selected plane parallel to ground; and wherein a compensation for the Ackerman steering nonlinearity for the single rate gyroscope is provided.

In one embodiment of the present invention, wherein the vehicle includes two controllable ground wheels and a main body, the step (A5) further comprises the following step: (A5, 2) providing the first sensor A comprising an average of two gyro sensors mounted on both controllable ground wheels to cancel the Ackerman steering nonlinearity; wherein the sensor A is configured to measure the selected plane parallel to ground.

In one embodiment of the present invention, wherein the vehicle includes at least one controllable ground wheel and a main body, the step (A) further comprises the following step: (A6, 1) providing the sensor B comprising a combination of gyros with outputs combined; wherein the sensor B is configured to measure the selected plane.

In one embodiment of the present invention, the step (A) further comprises the following steps: (A9) providing a vehicle having a main body and a rotatable vehicle arm; (A10) providing the first sensor A comprising a rate gyroscope attached to the rotatable vehicle arm; (A11) providing the sensor B comprising a rate gyroscope attached to the main body of the vehicle; and (A12) providing the sensor C comprising a contact switch configured to make a contact when the arm is at its nominal position.

Another aspect of the present invention is directed to an apparatus for estimation of relative coordinates between at least two parts of a system.

In one embodiment, the apparatus of the present invention comprises: a means (A) for measuring a set of relevant coordinates for each part of the system; and a means (B) for processing a set of measurements to estimate the relative coordinates between at least two parts of the system. In this embodiment of the present invention, the relative coordinates are selected from the group consisting of: {relative position coordinates; relative position rate (velocity) coordinates; relative position acceleration coordinates; relative angle coordinates; relative angular rate coordinates; and relative angular acceleration coordinates}.

In one embodiment of the present invention, wherein the system comprises a main body and at least one sub assembly, the means (A) further comprises: (A1) a first sensor A mounted to at least one sub assembly and configured to measure a movement rate of the sub assembly; (A2) a second sensor B mounted to the main body and configured to measure a movement rate of the main body; and (A3) a third absolute measurement sensor C configured to estimate an integrator offset and a drift rate due to the first sensor A bias and to the second sensor B bias. In this embodiment of the present invention, the movement rate of the sub assembly is selected from the group consisting of: {linear velocity, linear acceleration; angular velocity; and angular acceleration}. In this embodiment of the present invention, the movement rate of the main body is selected from the group consisting of: {linear velocity, linear acceleration; angular velocity; and angular acceleration}.

In one embodiment of the present invention, wherein the system comprises a main body and at least one sub assembly, the means (B) further comprises: a means (B1) configured to estimate a difference between the measurement results obtained by the sensor A and the sensor B; a means (B2) configured to integrate over time the difference estimate obtained by the means (B1) to estimate the relative motion between the main body and at least one sub assembly; and a means (B3) configured to process the estimate result obtained by the sensor C to provide a set of correction data to the estimate result obtained by the means (B2).

In one embodiment of the present invention, wherein the system comprises a vehicle having at least one controllable ground wheel and a main body, the means (A) further comprises: (A4) a sensor A comprising a single rate gyroscope attached to at least one controllable ground wheel of the vehicle; wherein the sensor A is configured to measure a selected plane parallel to ground; (A5) a sensor B comprising at least one rate gyroscope attached to the main body of the vehicle, wherein the sensor B is mounted in the selected plane and is configured to measure the selected plane; (A6) a sensor C configured to estimate an absolute steering angle of the vehicle based on the vehicle kinematics model; and (A7) a feedback compensator configured to estimate and to compensate the integrator offset and the drift rate based on estimation of the absolute steering angle obtained by the sensor C.

In one embodiment of the present invention, wherein the vehicle includes a single controllable ground wheel and a main body, the means (A4) further comprises the sensor A comprising a single rate gyroscope attached to the controllable ground wheel of the vehicle, wherein a compensation for the Ackerman steering nonlinearity for the single rate gyroscope is provided. In this embodiment of the present invention, the sensor A is configured to measure the selected plane parallel to ground.

In one embodiment of the present invention, wherein the vehicle includes two controllable ground wheels and a main body, the means (A4) further comprises the first sensor A comprising an average of two gyro sensors mounted on both controllable ground wheels and configured to cancel the Ackerman steering nonlinearity. In this embodiment of the present invention, the sensor A is configured to measure the selected plane parallel to ground.

In one embodiment of the present invention, wherein the system comprises a vehicle having at least one controllable ground wheel and a main body, the means (A5) further comprises the sensor B comprising a combination of gyros with outputs combined. In this embodiment of the present invention, the sensor B is configured to measure the selected plane.

In one embodiment of the present invention, wherein the system includes a vehicle having a main body and a rotatable vehicle arm, the means (A) further comprises: (A8) a sensor A comprising a rate gyroscope attached to the rotatable vehicle arm; (A9) a sensor B comprising a rate gyroscope attached to the main body of the vehicle; and (A10) a sensor C comprising a contact switch configured to make a contact when the arm is at its nominal position.

In one embodiment of the present invention, wherein the system includes a vehicle having a main body and an excavator arm, the sensor C further comprises a switch configured to make a contact when the excavator arm is at its nominal center position.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be comprised within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
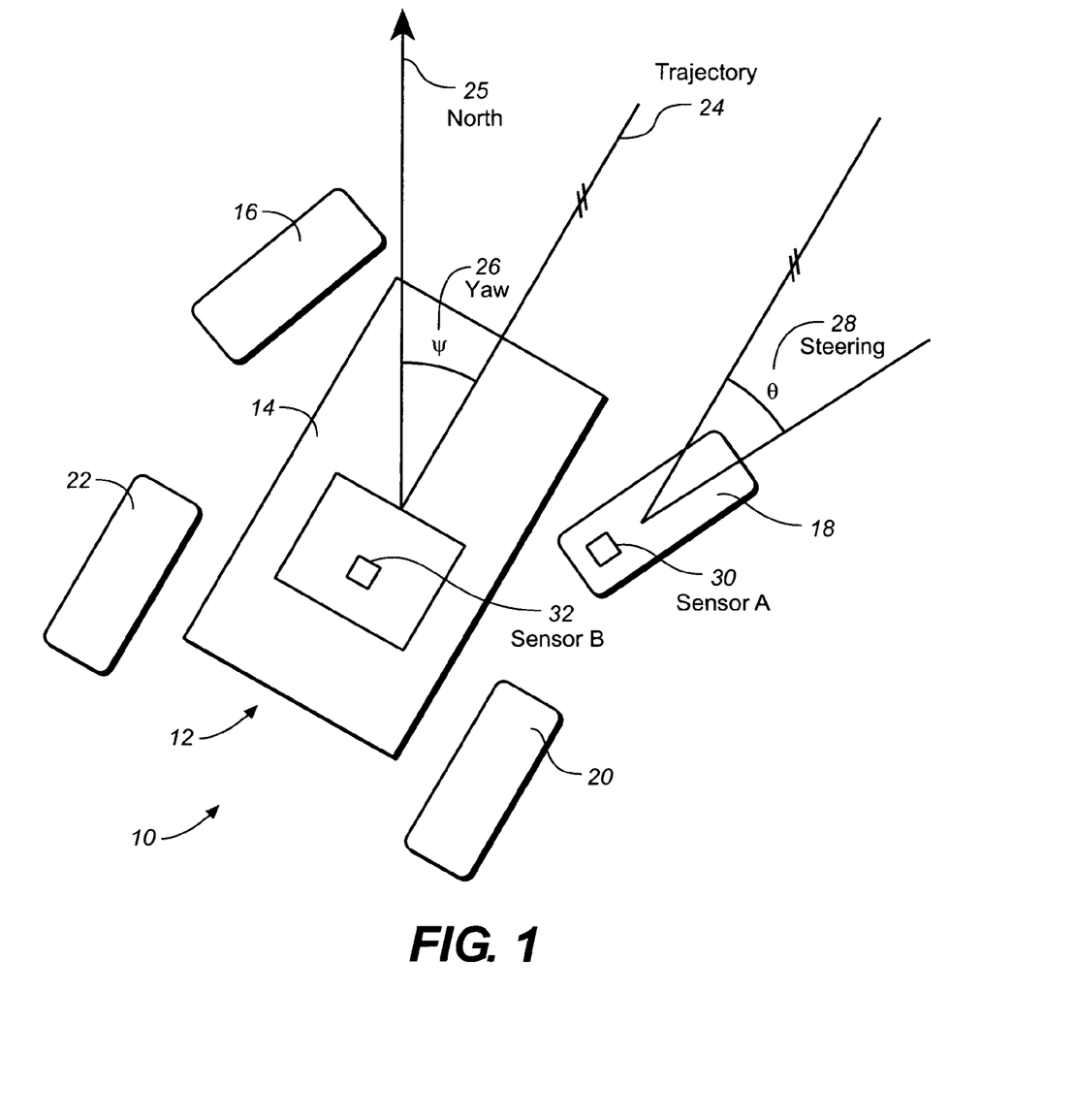
FIG. 1 depicts a diagram of the basic geometry of a vehicle having a main body and four ground wheels, wherein two front wheels are being steered by an Automatic Guidance System for the purposes of the present invention.

In one embodiment of the present invention, FIG. 1 depicts a diagram 10 of the basic geometry of a vehicle 12 having a main body 14 and four ground wheels 16, 18, 20 and 22, wherein two front wheels 16 and 18 are being steered by an Automatic Guidance System (not shown). The sensor A 30 is attached to a controllable ground wheel 18 of the vehicle 12. The sensor A is configured to measure a selected plane parallel to ground. The selected plane is a plane that is substantially orthogonal to a controlled ground wheel axis of rotation (controlled axis). The sensor B 32 is attached to the main body 14 of the vehicle 12. The sensor B is mounted in the selected plane and is configured to measure the selected plane.

In one embodiment of the present invention, the Automatic Guidance System can be implemented by using the Trimble® AgGPS® Autopilot system. The Trimble® AgGPS® Autopilot system is a steering assistant that connects to a tractor's hydraulic power steering system and automatically steers the tractor for straight, center pivot, curves or headlands. The Trimble® AgGPS® Autopilot system includes the AgGPS Navigation Controller including a light bar for visual guidance, an in-cab terminal for field operation, and a plurality of precise GPS receivers, including Real-time Kinematics (RTK) or Differential GPS (DGPS) receivers. The AgGPS 170 Field Computer running AgGPS FieldManager software can be added to the AgGPS Autopilot RTK or DGPS Lightbar Only (LBO) systems. The AgGPS® 170 Field Computer running AgGPS® FieldManager software can perform a number of operations including record-keeping, field mapping, variable rate management, land leveling, soil sampling, and planting. The AgGPS® Parallel Swathing Option and AgGPS Parallel Swathing Option Plus provide farm equipment operators with precision guidance for driving straight rows during field preparation, planting, and product applications. Both systems use a light bar that connects directly with the AgGPS receiver and is mounted on the dashboard or ceilings of vehicle cabs.

Referring still to FIG. 1, the yaw angle $\psi$ 26 of the main body 14 of the vehicle 12 is an angle between the North coordinate 25 and the trajectory 24 of the vehicle 12. The axis of the front controllable wheel 18 is deviated from the trajectory direction 24 by the steering angle θ 28. The Automatic Guidance System (not shown) utilizes the rate of change of the steering angle θ 28 and the rate of change of the yaw angle $\psi$ 26 as input signals in its closed loop control system. Please, see the full discussion below.

In one embodiment of the present invention, to measure the rate of change of the steering angle θ 28 the sensor A 30 is employed, whereas to measure the rate of change of the yaw angle $\psi$ 26 the sensor B 32 is utilized.

Figure 2:
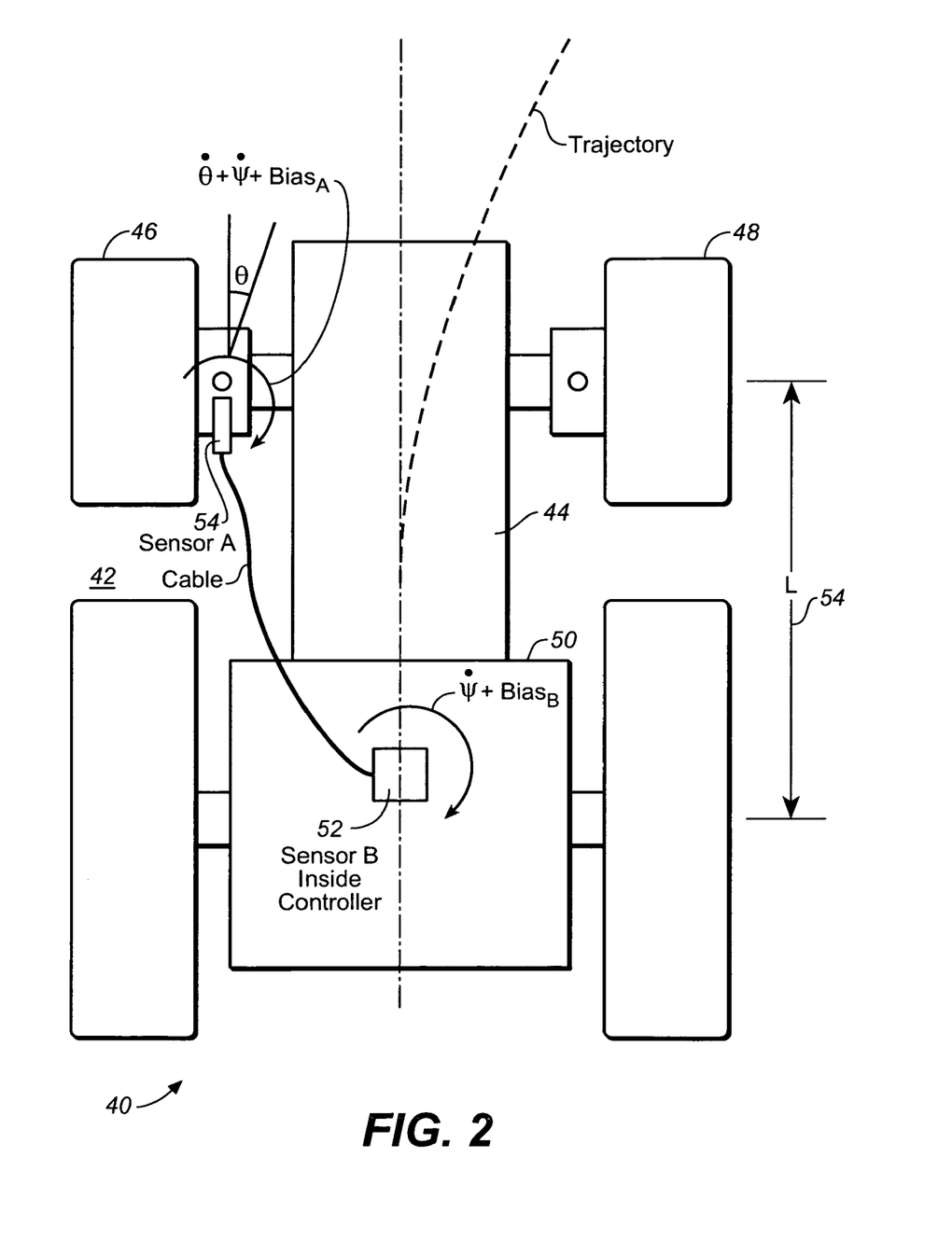
FIG. 2 shows the diagram of the basic geometry of a vehicle having a main body, controllable front wheels, and the Automatic Guidance System including a controller for the purposes of the present invention, wherein the coordinate sensor B is mounted inside the controller, and wherein the coordinate sensor A is mounted to one of the front wheels.

More specifically, in one embodiment of the present invention, FIG. 2 shows the diagram 10 of FIG. 1 in more details, including the vehicle 42 having a main body 44, controllable front wheels 46 and 48, and the Automatic Guidance System 50 including a controller. The sensor B 52 is mounted inside the controller on the main body, whereas the sensor A 54 is mounted on the front wheel 46 to measure movement rate of the front wheel (sub assembly) and the main body.

In one embodiment of the present invention, the sensor A is configured to measure:

$$\theta + \psi + \text{bias}_A \quad \text{(Eq. 1)}$$

that is, the sensor A is configured to measure the ground wheel's steering angle rate plus the yaw rate of the main body plus the sensor A bias.

In one embodiment of the present invention, the sensor B is configured to measure:

$$\psi + \text{bias}_B \quad \text{(Eq. 2)}$$

that is, the sensor B is configured to measure the yaw rate of the main body plus the sensor B bias.

Referring still to FIG. 2, in one embodiment of the present invention, a third sensor C is employed (not shown) to estimate an absolute steering angle $\theta_{est}$ of the vehicle based on the vehicle kinematics model, and a feedback compensator (not shown) is employed to estimate and to compensate the integrator offset and the drift rate based on estimation of the absolute steering angle obtained by the sensor C.

The third absolute measurement C is required for angle or position rate to prevent the degradation of performance in terms of resolution and/or noise.

Figure 3:
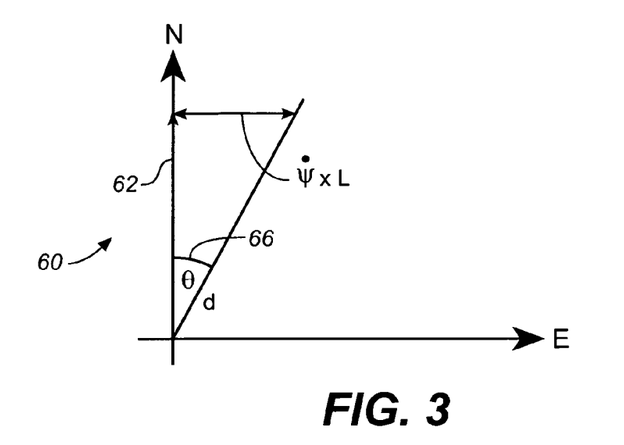
FIG. 3 illustrates the basic kinematics model of the vehicle for the purposes of the present invention.

More specifically, FIG. 3 illustrates the basic kinematics model 60 of the vehicle, wherein the vehicle is moving towards North 62, and the vehicle's main body yaw rate $\dot{\psi}$ causes the absolute steering of the vehicle's wheel to be $\theta_{est}$ 66 if the vehicle wheel base measurement is L (54 of FIG. 2):

$$\theta_{est} = \tan^{-1}\left(\frac{\dot{\psi} \times L}{V}\right) + \text{noise} \quad \text{(Eq. 3)}$$

In one embodiment of the present invention, the vehicle's main body yaw rate $\dot{\psi}$ can be derived from an output of the Kalman filter which uses the yaw rate obtained by the gyro sensor and the GPS-derived heading, whereas V is the GPS-derived velocity of the vehicle. Please, see discussion below.

Figure 4:
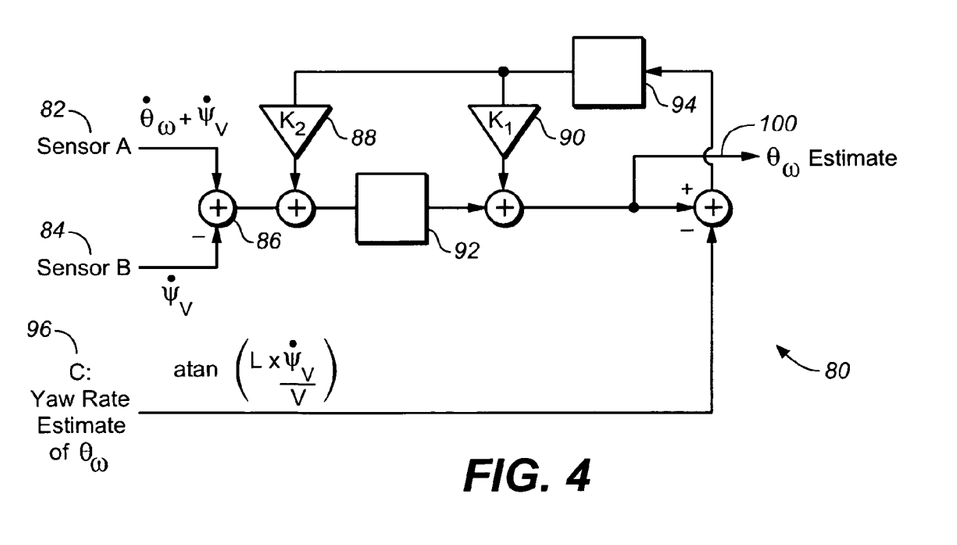
FIG. 4 depicts a block diagram that illustrates how to process the measurement results obtained by sensors A, B and C in order to obtain an estimate of the controllable wheel's steering angle θ for the purposes of the present invention.

In one embodiment of the present invention, FIG. 4 depicts a block diagram 80 that illustrates how to process the measurement results obtained by sensors A, B and C in order to obtain an estimate of the controllable wheel's steering angle $\theta$. The signal processing is not necessary when using a potentiometer, a linear variable differential transformer (LVDT), a rotational variable differential transformer (RVDT), a Hall effect sensor, a reed switch, a magneto-inductive sensor, or a magnetoresistive sensor as applied to conventional linear or rotary style sensors.

However, if the processing is required, for example, when sensors A and B are implemented by using gyros, it should be performed by a controller and should be robust and reliable in the presence of noise and other uncertainty parameters of a system (including a main body and at least one sub assembly) being controlled. One way to achieve these objectives is to use a modern robust control method.

To gain a perspective for robust control, it is useful to examine some basic concepts from control theory. Control theory can be broken down historically into two main areas: conventional control and modern control. Conventional control covers the concepts and techniques developed up to 1950. Modern control covers the techniques from 1950 to the present.

Conventional control became interesting with the development of feedback theory. Feedback was used in order to stabilize the control system. One early use of feedback control was the development of the flyball governor for stabilizing steam engines in locomotives. Another example was the use of feedback for telephone signals in the 1920s. The problem was the transmission of signals over long lines. There was a limit to the number of repeaters that could be added in series to a telephone line due to distortion. Harold Stephen Black proposed a feedback system that would use feedback to limit the distortion. Even though the added feedback sacrificed some gain in the repeater, it enhanced the overall performance.

Conventional control relies upon developing a model of the control system using differential equations. LaPlace transforms are then used to express the system equations in the frequency domain where they can be manipulated algebraically. The feedback signal is subtracted from the reference signal to determine the error signal. Further control is based on the error signal. Therefore, the system serves to bring the output as close as possible to the desired reference input. Due to the complexity of the mathematics, conventional control methods were used mostly for Single-Input-Single-Output (SISO) systems.

One development that was key to future developments in robust control was the root-locus method. Nyquist, Bode and others realized that the roots of the denominator polynomial determined the stability of the control system. These roots were referred to as "poles" of the transfer functions. The location of these poles had to be in the left half-plane of the complex frequency plot to guarantee stability. Root locus was developed as a method to graphically show the movements of poles in the frequency domain as the coefficients of the s-polynomial were changed. Movement into the right half plane meant an unstable system. Thus systems could be judged by their sensitivity to small changes in the denominator coefficients.

On the other hand, the modern control methods were developed with a realization that control system equations could be structured in such a way that computers could efficiently solve them. It was shown that any n-th order differential equation describing a control system could be reduced to n 1-st order equations. These equations could be arranged in the form of matrix equations. This method is often referred to as the state variable method. Modern control methods were extremely successful because they could be efficiently implemented on computers, they could handle Multiple-Input-Multiple-Output (MIMO) systems, and they could be optimized. Methods to optimize the constant state matrices were developed. For instance a spacecraft control system could be optimized to reach a destination in the minimum time or to use the minimum amount of fuel or some weighted combination of the two. The ability to design for performance and cost made these modern control systems highly desirable.

Robust control refers to the control of unknown plants with unknown dynamics subject to unknown disturbances. Clearly, the key issue with robust control systems is uncertainty and how the control system can deal with this problem. There is uncertainty in the model of the plant. There are disturbances that occur in the plant system. Also there is noise which is read on the sensor inputs. Each of these uncertainties can have an additive or multiplicative component.

Control system engineers are concerned with three main topics: observability, controllability and stability. Observability is the ability to observe all of the parameters or state variables in the system. Controllability is the ability to move a system from any given state to any desired state. Stability is often phrased as the bounded response of the system to any bounded input. Any successful control system will have and maintain all three of these properties. Uncertainty presents a challenge to the control system engineer who tries to maintain these properties using limited information.

One method to deal with uncertainty in the past was stochastic control. In stochastic control, uncertainties in the system are modeled as probability distributions. These distributions are combined to yield the control law. This method deals with the expected value of control. Abnormal situations may arise that deliver results that are not necessarily close to the expected value. This may not be acceptable for embedded control systems that have safety implications.

Robust control methods seek to bound the uncertainty rather than express it in the form of a distribution. Given a bound on the uncertainty, the control can deliver results that meet the control system requirements in all cases. Therefore robust control theory might be stated as a worst-case analysis method rather than a typical case method. It must be recognized that some performance may be sacrificed in order to guarantee that the system meets certain requirements.

In one embodiment of the present invention, referring still to FIG. 4, the difference estimate between the measurement results obtained by the sensor A 82 and the sensor B 84 at the subtractor 86 is integrated over time by the integrators 92 and 94 to measure the relative motion between the two sub-assemblies, with an ambiguous integrator offset and a drift rate due to sensor(s) bias.

From the engineering point of view, the maximum integration time delivers a tenth of the system error budget from a sensor pair that is at the upper specification limit of its bias plus offset. For example, if 0.1 degree error develops in a few seconds, the integration time should be on the order of the same few seconds.

The sensor C 96 is used to provide a set of correction data to the steering angle estimate result 100 in order to put a boundary on the uncertainty and perform a robust control. More specifically, the sensor C 96 is used to estimate the integrator offset and can also optionally be used to estimate the bias error of the inertial sensors. For example, the estimate of the absolute steering angle of (Eq. 3) can be used to provide the set of correction data. The feedback gains K1 90 and K2 88 are included to close the feedback loop.

Figure 5A:
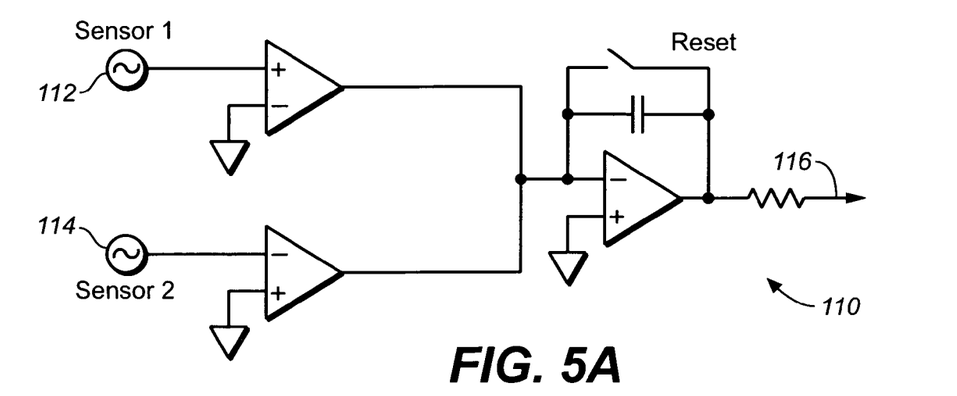
FIG. 5A is a block diagram that depicts the simple analog means of creating a single signal from two measurement sensors for the purposes of the present invention.
Figure 5B:
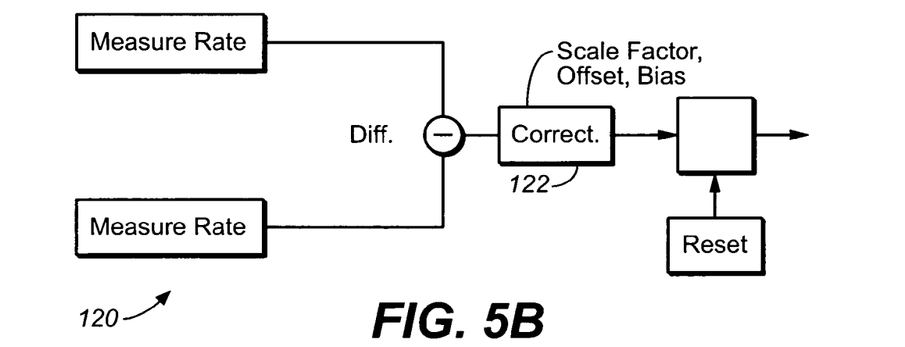
FIG. 5B illustrates a block diagram that shows how to add corrections including the scale factor, an integrator offset, or sensor biases to generate an accurate steering angle result for the purposes of the present invention.
Figure 5C:
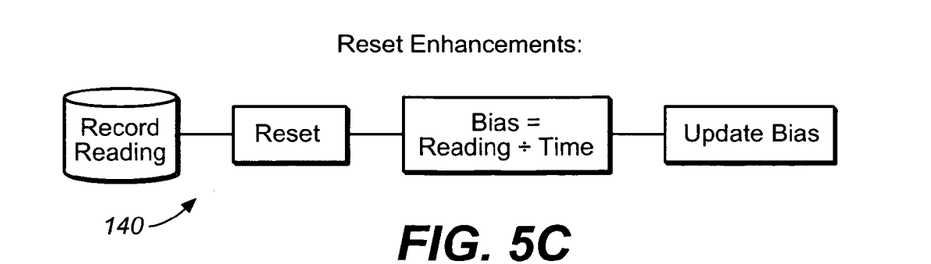
FIG. 5C shows a block diagram for added sensor bias estimator, wherein a measurement sensor bias is typically associated with temperature changes, vibrations, or aging of circuitry elements.
Figure 6:
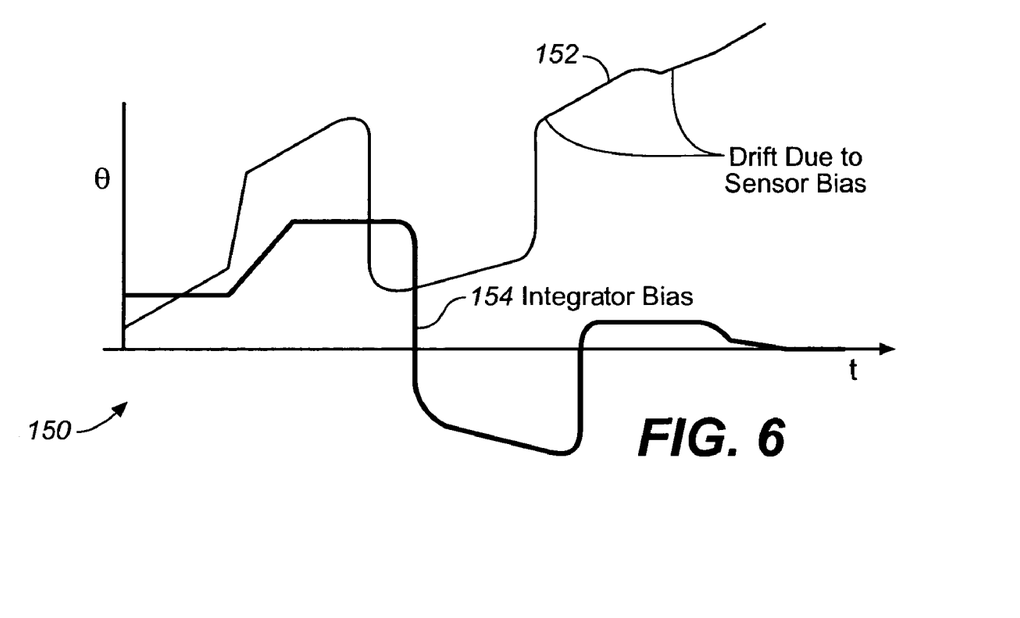
FIG. 6 illustrates an integrator bias over time and an integrator drift over time due to the sensor bias.

FIGS. 5A-5C illustrate the elements of the block diagram 80 of FIG. 4 in more details. FIG. 5A is a block diagram 110 that depicts the simple analog means of creating a single signal 116 from two measurement sensors: the sensor 1 112 and the sensor 2 114. FIG. 5B illustrates a block diagram 120 that shows how to add corrections 122 including the scale factor, an integrator offset, or sensor biases to generate an accurate steering angle result. FIG. 5C shows a block diagram 140 for added sensor bias estimator. A measurement sensor bias is typically associated with temperature changes, vibrations, or aging of circuitry elements. FIG. 6 illustrates the integrator bias 154 over time and the drift 152 over time due to the sensor bias.

Figure 7:
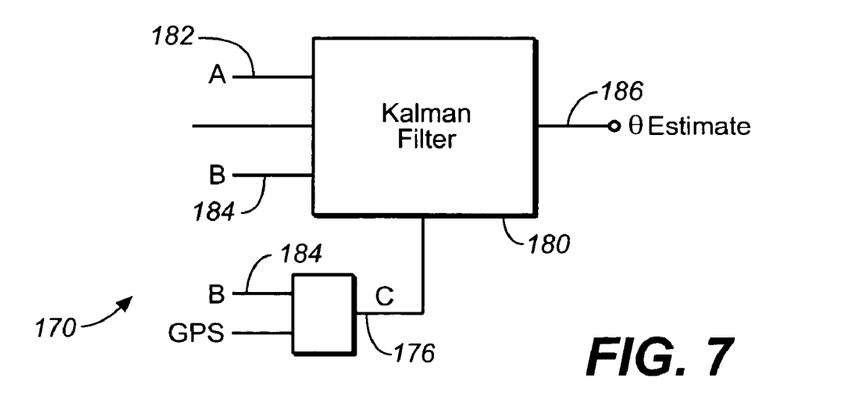
FIG. 7 depicts a controller having a feedback compensator comprising a Kaman filter.

In one embodiment of the present invention, as shown in FIG. 7, the controller 170 includes a feedback compensator further comprising a Kalman filter 180. In this embodiment of the present invention, the sensor C 176 is used to provide absolute corrections to the Kalman filter 180 that is configured to use the sensor A 182 and the sensor B 184 readings to provide an estimation of the steering angle 186.

Sensor A could be implemented by using an inertial sensor, or gyro sensor.

Accelerant Technology, Inc., located in San Francisco, Calif., has built small inertial sensors using three accelerometers to measure three components of the local acceleration vector, three magnetometers to measure three components of the local gravitational vector, plus some software. An accelerometer is a sensor that measures acceleration, speed and the distance by mathematically determining acceleration over time.

A magnetometer is a device that measures a local magnetic field. The local gravitational factor can be calculated by using the measured local magnetic field, because the local gravitational field, as well as the local magnetic field, are both defined by the local Earth geometry, as well explained in the book "Applied Mathematics in Integrated Navigation Systems", published by American Institute of Aeronautics and Astronautics, Inc, 2000, by Robert M. Rogers. Indeed, the "Applied Mathematics in Integrated Navigation Systems" teaches how geometrical shape and gravitational models for representing the Earth are used to provide relationship between ECEF position x-y-z components and local-level latitude, longitude, and attitude positions. The "Applied Mathematics in Integrated Navigation Systems" also teaches how to develop the functional characteristics of inertial sensors used in navigation systems, how to develop the time-varying dynamic error models for inertial sensors random errors.

Silicon Sensing Systems Japan Ltd., located at 1-10 Fuso-cho, Sumitomo Precision Building Amagasaki, Hyogo 660-0891 Japan, manufactures the rate gyroscope utilizing Coriolis effect of sensor element (vibrating resonator chip) to sense the speed of rotation (rate of turn) can be used for the purposes of the present invention. The new concept ring-shaped micro-machined resonator shows distinguished resistance against external shocks and vibrations over a wide range of temperature.

Spinning Mass Gyro, is the classical gyro, that has a mass spinning steadily with free movable axis (so called gimbal). When the gyro is tilted, gyroscopic effect causes precession (motion orthogonal to the direction tilt sense) on the rotating mass axis. The axis are fixed with springs and the spring tension is proportional to the precession speed. By integrating the spring tension one would get the angle. Angular velocity (rate of turn) sensor, therefore, is rate-gyroscope. Nowadays most gyroscopes are actually rate-gyroscopes.

Second sensor B could be implemented by using an inertial sensor, a gyro sensor, or a different class of sensors such as GPS, laser ranging etc, to measure the movement rate of the main body.

Applications.

The present invention for new steering angle assembly sensor approach has been utilized to satisfy the steering angle requirements for front wheel steered and articulated steered (center pivot) vehicles controlled closed loop system. The angular rate (for example, gyro) sensors could be attached on one or both of arm assembly(s), or on any steering element that rotates directly as a function of vehicular steering action. The gyro axis should be roughly parallel to the axis of rotation of the rotating member to be measured, and can be located anywhere on the rotating member. The steering element angular measurement will be relative to the vehicle chassis supporting the controller and GPS antenna. The difference between the chassis and steering assembly values is the actual steering rate of interest. In the Automatic Guidance System system, the steering sensor is the key to continuous feedback element in the control loop. The chassis angle or angular rate can be established using several sensors options utilized with the Automatic Guidance System: (Option A) GPS position and time history measurements; (Option B) gyro sensors included in the inertial measurement unit (IMU) (using inertial sensors) portion of the Automatic Guidance System controller; and (Option C) two GPS antennas mounted to the chassis (option not currently offered for the Automatic Guidance System). The chassis gyro (IMU) or GPS values can be used to calculate the actual steering rate as a pseudo-absolute steering angle or angular rate. The basis of the calculation is to establish a true straight-ahead (not turning) heading using GPS and biasing the measured steering assembly angular rate accordingly. Thermal gyro signal drift can be addressed by setting the bias voltage while stopped, as is done with gyros in the current IMU. Utilizing gyro sensors allows for a direct accounting of the non-linearity associated with typical Ackermann steering systems by averaging the two measurements. An Ackermann steering system is considered for the purposes of the present invention to demonstrate robust control of systems with uncertain physical parameters.

EXAMPLE I

Vehicle Steering Wheel Angle Measurement.

Sensor A-rate gyroscope attached to one steering front wheel of vehicle, sensing plane parallel to ground. Sensor B—rate gyroscope attached to main body of vehicle, mounted in the same plane (or a combination of gyros with outputs combined in such a way to measure the same plane). Measurement C (see (Esq. 3) is a noisy measurement of steering angle, based on a vehicle's Kinematics behavior. For sensor A, either one sensor + compensation for the Ackerman steering nonlinearity can be used, or the average of two sensors mounted on both steering front wheels to cancel this nonlinearity.

EXAMPLE II

Excavator Arm Angle Measurement

Sensor A—a rate gyro mounted on the excavator body. Sensor B—a rate gyro mounted on the excavator arm. Sensor C—a fiducial contact switch making contact when the excavator arm is at its nominal center position.

Another aspect of the present invention is directed to a method for estimation of relative coordinates between at least two parts of a system.

In one embodiment, the method of the present invention comprises the following steps (not shown): (A) providing each of at least two parts of the system with at least one coordinate sensor; (B) measuring a set of relevant coordinates for each relevant part of the system; and (C) processing each measurement result performed in the step (B) to estimate the relative coordinates between at least two the parts of the system. In this embodiment of the present invention, the relative coordinates are selected from the group consisting of: {relative position coordinates; relative position rate (velocity) coordinates; relative position acceleration coordinates; relative angle coordinates; relative angular rate coordinates; and relative angular acceleration coordinates}.

In one embodiment of the present invention, wherein the system comprises a main body and at least one sub assembly, the step (A) further comprises the following steps (not shown): (A1) mounting a first sensor A to at least one sub assembly to measure a movement rate of the sub assembly; (A2) mounting a second sensor B to the main body to measure a movement rate of the main body; and (A3) providing a third absolute measurement sensor C configured to estimate an integrator offset and a drift rate due to the first sensor A bias and to the second sensor B bias. In this embodiment of the present invention, the movement rate of the main body is selected from the group consisting of: {linear velocity, linear acceleration; angular velocity; and angular acceleration}. In this embodiment of the present invention, the movement rate of the sub assembly is selected from the group consisting of: {linear velocity, linear acceleration; angular velocity; and angular acceleration}.

In one embodiment of the present invention, wherein the system comprises a main body and at least one sub assembly, the step (B) further comprises the following steps (not shown): (B1) using the first sensor A to measure the movement rate of at least one sub assembly; (B2) using the second sensor B to measure the movement rate of the main body; and (B3) using the third sensor C measurement to estimate the integrator offset and the drift rate due to the first sensor A bias and due to the second sensor B bias.

In one embodiment of the present invention, the step (C) further comprises the following steps (not shown: (C1) processing the measurement result performed in the step (B1) and the measurement result performed in the step (B2) to estimate a difference between the measurement result performed in the step (B1) and the measurement result performed in the step (B2); (C2) integrating over time the difference estimate obtained in the step (C1) to estimate the relative motion between the main body and at least one sub assembly; and (C3) processing the estimate result performed in the step (B3) to provide a set of correction data to the estimate result obtained in the step (C2).

In one embodiment of the present invention, the step (C2) further comprises the step of integrating over substantially continuous time period the difference estimate obtained in the step (C1) to estimate the relative motion between the main body and at least one sub assembly.

In one embodiment of the present invention, the step (A) further comprises the following steps (not shown): (A4) providing a vehicle having at least one controllable ground wheel and a main body; (A5) providing the sensor A comprising a single rate gyroscope attached to at least one controllable ground wheel of the vehicle, wherein the sensor A is configured to measure a selected plane parallel to ground; (A6) providing the sensor B comprising at least one rate gyroscope attached to the main body of the vehicle, wherein the sensor B is mounted in the selected plane and is configured to measure the selected plane; (A7) providing the sensor C configured to estimate an absolute steering angle of the vehicle based on the vehicle kinematics model; and (A8) using a feedback compensator to estimate and to compensate the integrator offset and the drift rate based on estimation of the absolute steering angle performed in the step (A7).

In one embodiment of the present invention, wherein the vehicle includes a single controllable ground wheel and a main body, the step (A5) further comprises the following step: (A5, 1) providing the sensor A comprising a single rate gyroscope attached to the controllable ground wheel of the vehicle; wherein the sensor A is configured to measure a selected plane parallel to ground; and wherein a compensation for the Ackerman steering nonlinearity for the single rate gyroscope is provided.

In one embodiment of the present invention, wherein the vehicle includes two controllable ground wheels and a main body, the step (A5) further comprises the following step: (A5, 2) providing the first sensor A comprising an average of two gyro sensors mounted on both controllable ground wheels to cancel the Ackerman steering nonlinearity; wherein the sensor A is configured to measure the selected plane parallel to ground.

In one embodiment of the present invention, wherein the vehicle includes at least one controllable ground wheel and a main body, the step (A) further comprises the following step: (A6, 1) providing the sensor B comprising a combination of gyros with outputs combined; wherein the sensor B is configured to measure the selected plane.

In one embodiment of the present invention, the step (A) further comprises the following steps (not shown): (A9) providing a vehicle having a main body and a rotatable vehicle arm; (A10) providing the first sensor A comprising a rate gyroscope attached to the rotatable vehicle arm; (A11) providing the sensor B comprising a rate gyroscope attached to the main body of the vehicle; and (A12) providing the sensor C comprising a contact switch configured to make a contact when the arm is at its nominal position.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for estimation of relative coordinates between at least two parts of a system comprising the steps of:
   (A) providing each of said at least two parts of said system with at least one coordinate sensor;
   (B) measuring a set of relevant coordinates for each said parts of said system; and
   (C) processing each said measurement result performed in said step (B) to estimate said relative coordinates between at least two said parts of said system; wherein said relative coordinates are selected from the group consisting of: relative position coordinates; relative position rate (velocity) coordinates; relative position acceleration coordinates; relative angle coordinates; relative angular rate coordinates; and relative angular acceleration coordinates.

2. The method of claim 1, wherein said system comprises a main body and at least one sub assembly; and wherein said step (A) further comprises the steps of:
   (A1) mounting a first sensor A to said at least one sub assembly to measure a movement rate of said sub assembly; wherein said movement rate of said sub assembly is selected from the group consisting of: linear velocity, linear acceleration; angular velocity; and angular acceleration;
   (A2) mounting a second sensor B to said main body to measure a movement rate of said main body; wherein said movement rate of said main body is selected from the group consisting of: linear velocity, linear acceleration; angular velocity; and angular acceleration; and
   (A3) providing a third absolute measurement sensor C configured to estimate an integrator offset and a drift rate due to said first sensor A bias and to said second sensor B bias.

3. The method of claim 2, wherein said step (B) further comprises the steps of:
   (B1) using said first sensor A to measure said movement rate of said at least one sub assembly;
   (B2) using said second sensor B to measure said movement rate of said main body; and
   (B3) using said third sensor C measurement to estimate said integrator offset and said drift rate due to said first sensor A bias and due to said second sensor B bias.

4. The method of claim 2, wherein said step (C) further comprises the steps of:
   (C1) processing said measurement result performed in said step (B1) and said measurement result performed in said step (B2) to estimate a difference between said measurement result performed in said step (B1) and said measurement result performed in said step (B2);
   (C2) integrating over time said difference estimate obtained in said step (C1) to estimate said relative motion between said main body and said at least one sub assembly; and
   (C3) processing said estimate result performed in said step (B3) to provide a set of correction data to said estimate result obtained in said step (C2).

5. The method of claim 4, wherein said step (C2) further comprises the step of:
   (C2, 1) integrating over substantially continuous time period said difference estimate obtained in said step (C1) to estimate said relative motion between said main body and said at least one sub assembly.

6. The method of claim 1, wherein said step (A) further comprises the following steps of:
   (A4) providing a vehicle having at least one controllable ground wheel and a main body;
   (A5) providing said sensor A comprising a single rate gyroscope attached to said at least one controllable ground wheel of said vehicle; and wherein said sensor A is configured to measure a selected plane parallel to ground;
   (A6) providing said sensor B comprising at least one rate gyroscope attached to said main body of said vehicle, wherein said senor B is mounted in said selected plane and is configured to measure said selected plane;
   (A7) providing said sensor C configured to estimate an absolute steering angle of said vehicle based on said vehicle kinematics model; and
   (A8) using a feedback compensator to estimate and to compensate said integrator offset and said drift rate based on estimation of said absolute steering angle performed in said step (A7).

7. The method of claim 6, wherein said vehicle includes a single controllable ground wheel and a main body; and wherein said step (A5) further comprises the following step of:
   (A5, 1) providing said sensor A comprising a single rate gyroscope attached to said controllable ground wheel of said vehicle; and wherein said sensor A is configured to measure a selected plane parallel to ground; and wherein a compensation for the Ackerman steering nonlinearity for said single rate gyroscope is provided.

8. The method of claim 6, wherein said vehicle includes two controllable ground wheels and a main body; wherein said step (A5) further comprises the following step of:
   (A5, 2) providing said first sensor A comprising an average of two gyro sensors mounted on both controllable ground wheels to cancel the Ackerman steering nonlinearity; wherein said sensor A is configured to measure said selected plane parallel to ground.

9. The method of claim 6, wherein said step (A6) further comprises the following step of:
   (A6, 1) providing said sensor B comprising a combination of gyros with outputs combined; wherein said sensor B is configured to measure said selected plane.

10. The method of claim 1, wherein said step (A) further comprises the following steps of:
    (A9) providing a vehicle having a main body and a rotatable vehicle arm;
    (A10) providing said first sensor A comprising a rate gyroscope attached to said arm;
    (A11) providing said sensor B comprising a rate gyroscope attached to said main body of said vehicle, and
    (A12) providing said sensor C comprising a contact switch configured to make a contact when said arm is at its nominal position.

11. An apparatus for estimation of relative coordinates between at least two parts of a system comprising:
    (A) a means for measuring a set of relevant coordinates for each said part of said system; and (B) a means for processing a set of measurements to estimate said relative coordinates between at least two said parts of said system; wherein said relative coordinates are selected from the group consisting of: relative position coordinates; relative position rate (velocity) coordinates; relative position acceleration coordinates; relative angle coordinates; relative angular rate coordinates; and relative angular acceleration coordinates.

12. The apparatus of claim 11, wherein said system comprises a main body and at least one sub assembly; and wherein said means (A) further comprises:
- (A1) a first sensor A mounted to said at least one sub assembly and configured to measure a movement rate of said sub assembly; wherein said movement rate is selected from the group consisting of: linear velocity, linear acceleration; angular velocity; and angular acceleration;
- (A2) a second sensor B mounted to said main body and configured to measure a movement rate of said main body; wherein said movement rate is selected from the group consisting of: linear velocity, linear acceleration; angular velocity; and angular acceleration; and
- (A3) a third absolute measurement sensor C configured to estimate an integrator offset and a drift rate due to said first sensor A bias and to said second sensor B bias.

13. The apparatus of claim 12, wherein said means (B) further comprises:
- (B1) a means configured to estimate a difference between said measurement results obtained by said sensor A and said sensor B;
- (B2) a means configured to integrate over time said difference estimate obtained by said means (B1) to estimate said relative motion between said main body and said at least one sub assembly; and
- (B3) a means configured to process said estimate result obtained by said sensor C to provide a set of correction data to said estimate result obtained by said means (B2).

14. The apparatus of claim 11, wherein said system comprises a vehicle having at least one controllable ground wheel and a main body; and wherein said means (A) further comprises:
- (A4) a sensor A comprising a single rate gyroscope attached to said at least one controllable ground wheel of said vehicle; wherein said sensor A is configured to measure a selected plane parallel to ground;
- (A5) a sensor B comprising at least one rate gyroscope attached to said main body of said vehicle, wherein said senor B is mounted in said selected plane and is configured to measure said selected plane;
- (A6) a sensor C configured to estimate an absolute steering angle of said vehicle based on said vehicle kinematics model; and
- (A7) a feedback compensator configured to estimate and to compensate said integrator offset and said drift rate based on estimation of said absolute steering angle obtained by said sensor C.

15. The apparatus of claim 14, wherein said vehicle includes a single controllable ground wheel and a main body; and wherein said means (A4) further comprises:
- (A4, 1) said sensor A comprising a single rate gyroscope attached to said controllable ground wheel of said vehicle; wherein said sensor A is configured to measure a selected plane parallel to ground; and wherein a compensation for the Ackerman steering nonlinearity for said single rate gyroscope is provided.

16. The apparatus of claim 14, wherein said vehicle includes two controllable ground wheels and a main body; and wherein said means (A4) further comprises:
- (A4, 2) said first sensor A comprising an average of two gyro sensors mounted on both controllable ground wheels and configured to cancel the Ackerman steering nonlinearity; wherein said sensor A is configured to measure said selected plane parallel to ground.

17. The apparatus of claim 14, wherein said means (A5) further comprises:
- (A5, 1) said sensor B comprising a combination of gyros with outputs combined; wherein said sensor B is configured to measure said selected plane.

18. The apparatus of claim 11, wherein said system includes a vehicle having a main body and a rotatable vehicle arm; and wherein said means (A) further comprises:
- (A8) a sensor A comprising a rate gyroscope attached to said arm;
- (A9) a sensor B comprising a rate gyroscope attached to said main body of said vehicle; and
- (A10) a sensor C comprising a contact switch configured to make a contact when said arm is at its nominal position.

19. The apparatus of claim 18, wherein said system includes a vehicle having a main body and an excavator arm; and wherein said sensor C further comprises:
a switch configured to make a contact when said excavator arm is at its nominal center position.

* * * * *